(12) United States Patent
Reddy et al.

(10) Patent No.: US 11,539,486 B2
(45) Date of Patent: Dec. 27, 2022

(54) SSB ENHANCEMENTS FOR FINE TIME-FREQUENCY ESTIMATION IN NR

(71) Applicant: QUALCOMM Incorporated, San Diego, CA (US)

(72) Inventors: AKula Reddy, San Diego, CA (US); Jing Sun, San Diego, CA (US); Srinivas Yerramalli, hyderabad (IN); Tao Luo, San Diego, CA (US); Xiaoxia Zhang, San Diego, CA (US); Ahmed Abdelaziz Ibrahim Abdelaziz Zewail, San Diego, CA (US); Wooseok Nam, San Diego, CA (US); Sungwoo Park, Seoul (KR)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/089,562

(22) Filed: Nov. 4, 2020

(65) Prior Publication Data
US 2021/0135815 A1 May 6, 2021

Related U.S. Application Data

(60) Provisional application No. 62/931,017, filed on Nov. 5, 2019.

(51) Int. Cl.
*H04L 5/00* (2006.01)
*H04L 27/26* (2006.01)

(52) U.S. Cl.
CPC ............ *H04L 5/0048* (2013.01); *H04L 5/001* (2013.01); *H04L 27/2613* (2013.01)

(58) Field of Classification Search
CPC ................. H04L 5/0053; H04L 5/0048; H04L 27/26025; H04L 5/0007; H04L 5/0091; H04W 72/0453
See application file for complete search history.

(56) References Cited

U.S. PATENT DOCUMENTS

| 2016/0192425 A1* | 6/2016 | Chae ................ H04W 72/0446 370/329 |
| 2019/0132170 A1 | 5/2019 | Si et al. |
| 2019/0150121 A1* | 5/2019 | Abdoli ................. H04L 5/0092 370/329 |

(Continued)

FOREIGN PATENT DOCUMENTS

WO    2018219257 A1    12/2018

OTHER PUBLICATIONS

International Search Report and Written Opinion—PCT/US2020/059129—ISA/EPO—dated Feb. 17, 2021.

(Continued)

*Primary Examiner* — Aristocratis Fotakis
(74) *Attorney, Agent, or Firm* — Arent Fox LLP/Qualcomm Incorporated

(57) ABSTRACT

In an aspect, the present disclosure includes a method, apparatus, and computer readable medium for wireless communications for generating, by a network entity for a user equipment (UE), a synchronization signal block (SSB) and an additional resource signal (RS) based on a variable function of a SSB subcarrier spacing (SCS) for communication after initial acquisition; and transmitting, by the network entity to the UE, the SSB including the additional RS.

27 Claims, 15 Drawing Sheets

(56) References Cited

U.S. PATENT DOCUMENTS

| | | | | |
|---|---|---|---|---|
| 2019/0223084 | A1* | 7/2019 | John Wilson | H04W 74/008 |
| 2019/0223163 | A1* | 7/2019 | Ko | H04W 48/12 |
| 2019/0306832 | A1* | 10/2019 | Si | H04W 56/0015 |
| 2020/0100197 | A1* | 3/2020 | Pan | H04W 72/005 |
| 2020/0267730 | A1* | 8/2020 | Kim | H04L 5/0023 |
| 2020/0367242 | A1* | 11/2020 | Moon | H04L 1/00 |
| 2021/0007066 | A1* | 1/2021 | Lin | H04L 5/0051 |
| 2021/0022186 | A1* | 1/2021 | Liu | H04W 74/006 |
| 2021/0051683 | A1* | 2/2021 | Li | H04L 41/0806 |
| 2021/0058931 | A1* | 2/2021 | Da | H04L 5/0028 |
| 2021/0084687 | A1* | 3/2021 | Liu | H04L 5/00 |
| 2021/0153107 | A1* | 5/2021 | Xu | H04L 5/0048 |
| 2021/0153209 | A1* | 5/2021 | Guan | H04W 72/042 |
| 2021/0392505 | A1* | 12/2021 | Harada | H04W 72/1273 |

OTHER PUBLICATIONS

Mediatek Inc: "DL Signals and Channels for NR-U Operation", 3GPP TSG RAN WG1 Meeting #95, 3GPP Draft; R1-1812354 DL Signals and Channels for NR-U Operation Final, 3rd Generation Partnership Project (3GPP), Mobile Competence Centre, 650, Route Des Lucioles, F-06921 Sophia-Antipolis Cedex vol. RAN WG1, No. Spokane, USA; Nov. 12, 2018-Nov. 16, 2018, Nov. 11, 2018 (Nov. 11, 2018), 7 Pages, XP051554263.

* cited by examiner

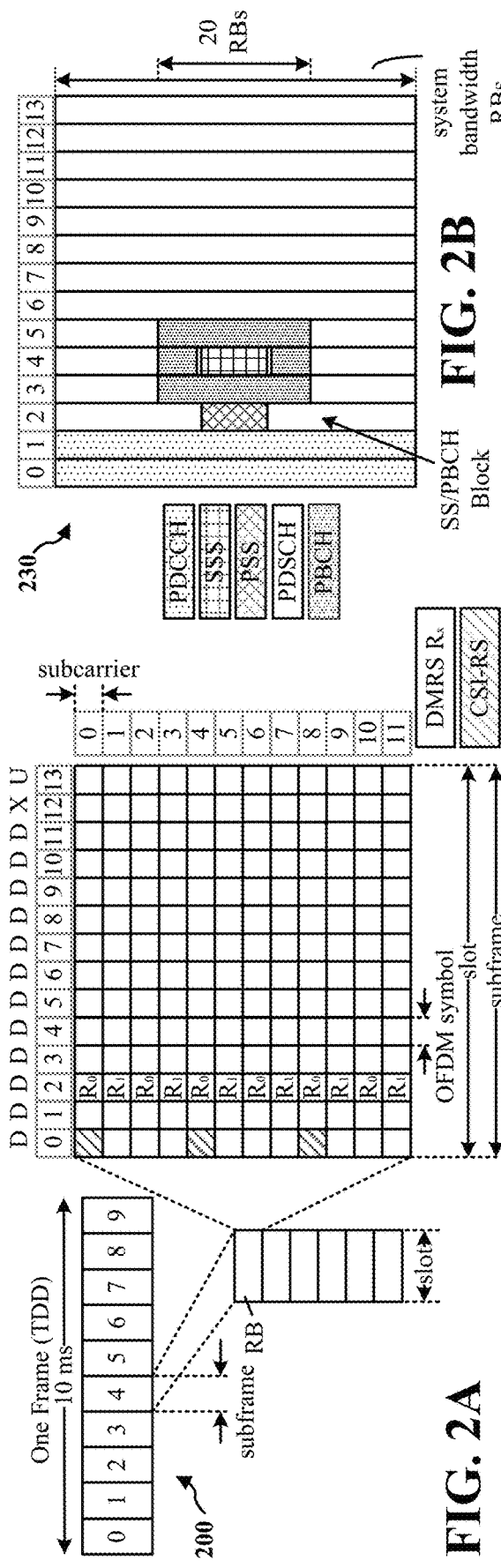
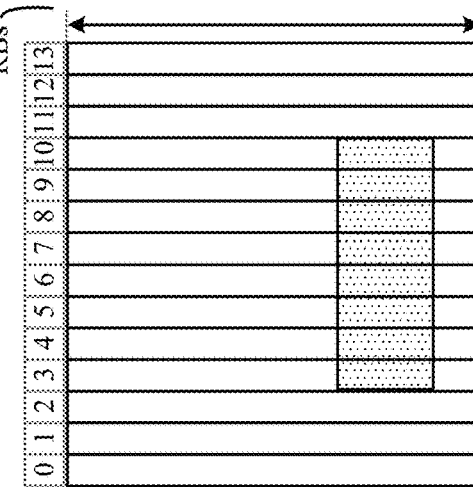
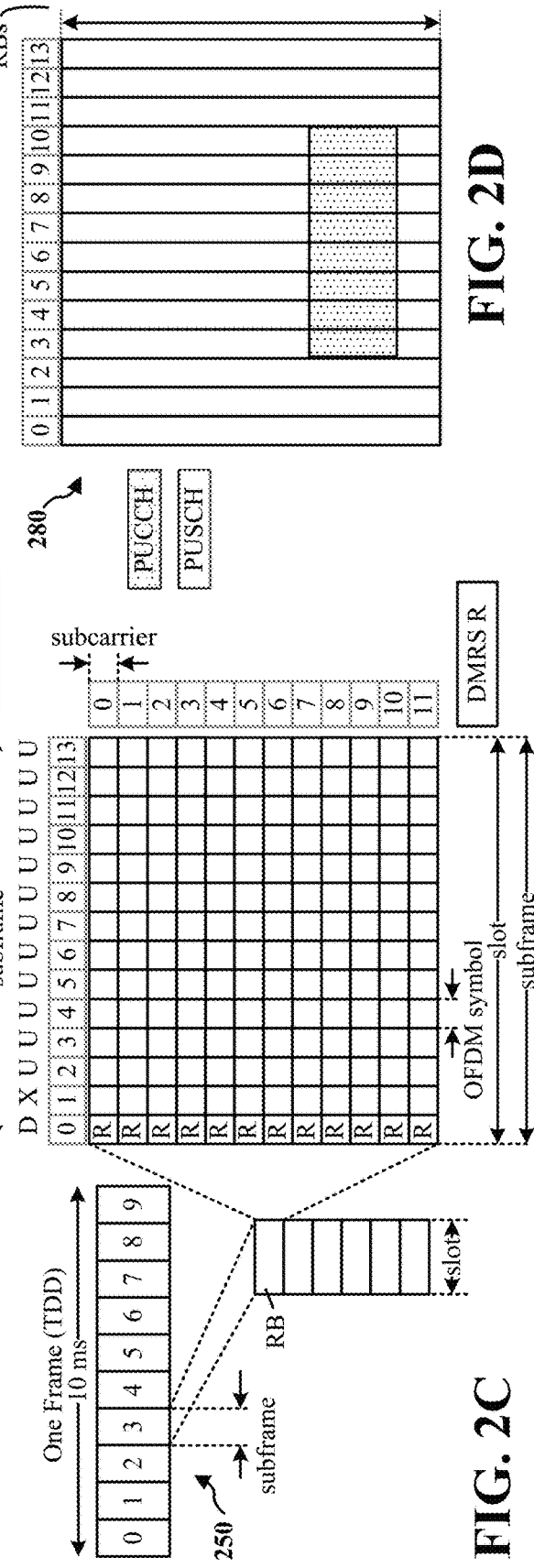
FIG. 2A  FIG. 2B  FIG. 2C  FIG. 2D

SSB ENHANCEMENTS FOR FINE TIME-FREQUENCY ESTIMATION IN NR

CROSS-REFERENCE TO RELATED APPLICATION(S)

The present application claims benefit of U.S. Provisional Application No. 62/931,017 entitled "SSB ENHANCEMENTS FOR FINE TIME-FREQUENCY ESTIMATION IN NR" filed Nov. 5, 2019, which is assigned to the assignee hereof and hereby expressly incorporated by reference herein.

BACKGROUND

Technical Field

The present disclosure relates generally to communication systems, and more particularly, to synchronization signal block (SSB) enhancements for fine time-frequency estimation in 5G New Radio (NR).

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

Due to the increasing demand for wireless communications, there is a desire to improve the efficiency of wireless communication network techniques.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An example implementation includes a method of wireless communication, including generating, by a network entity for a user equipment (UE), a synchronization signal block (SSB) and an additional resource signal (RS) based on a variable function of a SSB subcarrier spacing (SCS) for communication after initial acquisition; and transmitting, by the network entity to the UE, the SSB including the additional RS.

In a further example, an apparatus for wireless communication is provided that includes a transceiver, a memory configured to store instructions, and one or more processors communicatively coupled with the transceiver and the memory. The one or more processors are configured to generate, by a network entity for a UE, a SSB and an additional RS based on a variable function of a SSB SCS for communication after initial acquisition; and transmit, by the network entity to the UE, the SSB including the additional RS.

In another aspect, an apparatus for wireless communication is provided that includes means for generating, by a network entity for a UE, a SSB and an additional RS based on a variable function of a SSB SCS for communication after initial acquisition; and means for transmitting, by the network entity to the UE, the SSB including the additional RS.

In yet another aspect, a non-transitory computer-readable medium is provided including code executable by one or more processors to generate, by a network entity for a UE, a SSB and an additional RS based on a variable function of a SSB SCS for communication after initial acquisition; and transmit, by the network entity to the UE, the SSB including the additional RS.

Another example implementation includes a method of wireless communication, including receiving, by a UE from a network entity, a SSB and an additional RS based on a variable function of a SSB SCS for communication after initial acquisition; and decoding, by the UE, the SSB including the additional RS.

In a further example, an apparatus for wireless communication is provided that includes a transceiver, a memory configured to store instructions, and one or more processors communicatively coupled with the transceiver and the memory. The one or more processors are configured to execute the instructions to receive, by a UE from a network entity, a SSB and an additional RS based on a variable function of a SSB SCS for communication after initial acquisition; and decode, by the UE, the SSB including the additional RS.

In another aspect, an apparatus for wireless communication is provided that includes means for receiving, by a UE from a network entity, a SSB and an additional RS based on a variable function of a SSB SCS for communication after initial acquisition; and means for decoding, by the UE, the SSB including the additional RS.

In yet another aspect, a non-transitory computer-readable medium is provided including code executable by one or more processors to receive, by a UE from a network entity, a SSB and an additional RS based on a variable function of a SSB SCS for communication after initial acquisition; and decode, by the UE, the SSB including the additional RS.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

DETAILED DESCRIPTION

Figure 1:
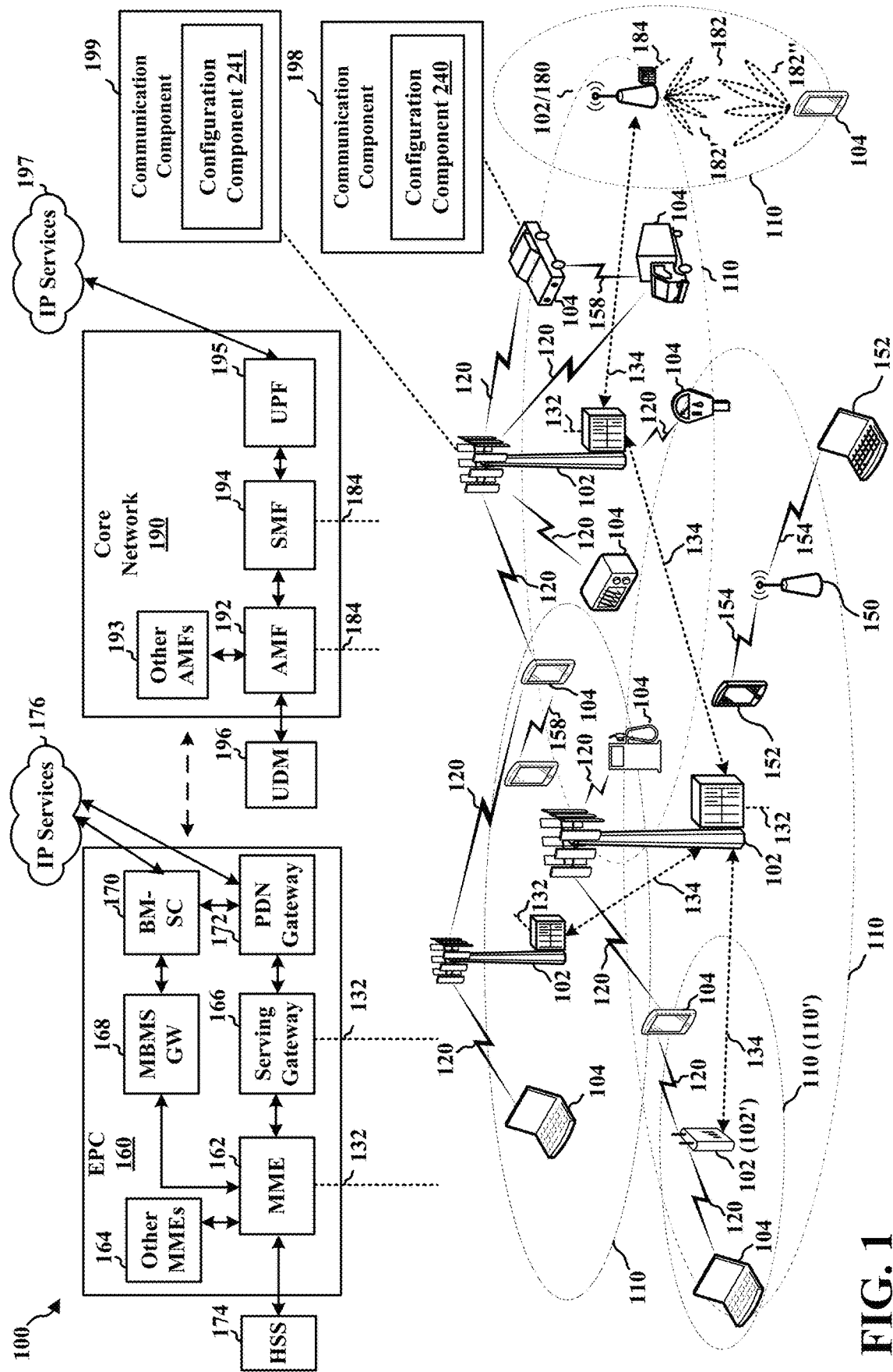
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software may be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100 configured for determining an evaluation period for a multi-panel UE. The wireless communications system (also referred to as a wireless wide area network (WWAN)) includes base stations 102, UEs 104, an Evolved Packet Core (EPC) 160, and another core network 190 (e.g., a 5G Core (5GC)).

In certain aspects, the UE 104 may be configured to operate communication component 198 and/or configuration component 240 to receive, from a network entity, a synchronization signal block (SSB) and an additional resource signal (RS) based on a variable function of a SSB subcarrier spacing (SCS) for communication after initial acquisition; and to decode the SSB including the additional RS.

Correspondingly, in certain aspects, the network entity 102 (e.g., base station) may be configured to operate communication component 199 and/or configuration component 241 to generate, for a UE, a SSB and an additional RS based on a variable function of a SSB SCS for communication after initial acquisition; and transmit, to the UE, the SSB including the additional RS.

The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 132, 134, and 184 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

FIGS. 2A-2D include diagrams of example frame structures and resources that may be utilized in communications between the base stations 102, the UEs 104, and/or the secondary UEs (or sidelink UEs) 110 described in this disclosure. FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2^\mu * 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=0$ with 1 slot per subframe. The subcarrier spacing is 15 kHz and symbol duration is approximately 66.7 $\mu$s.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
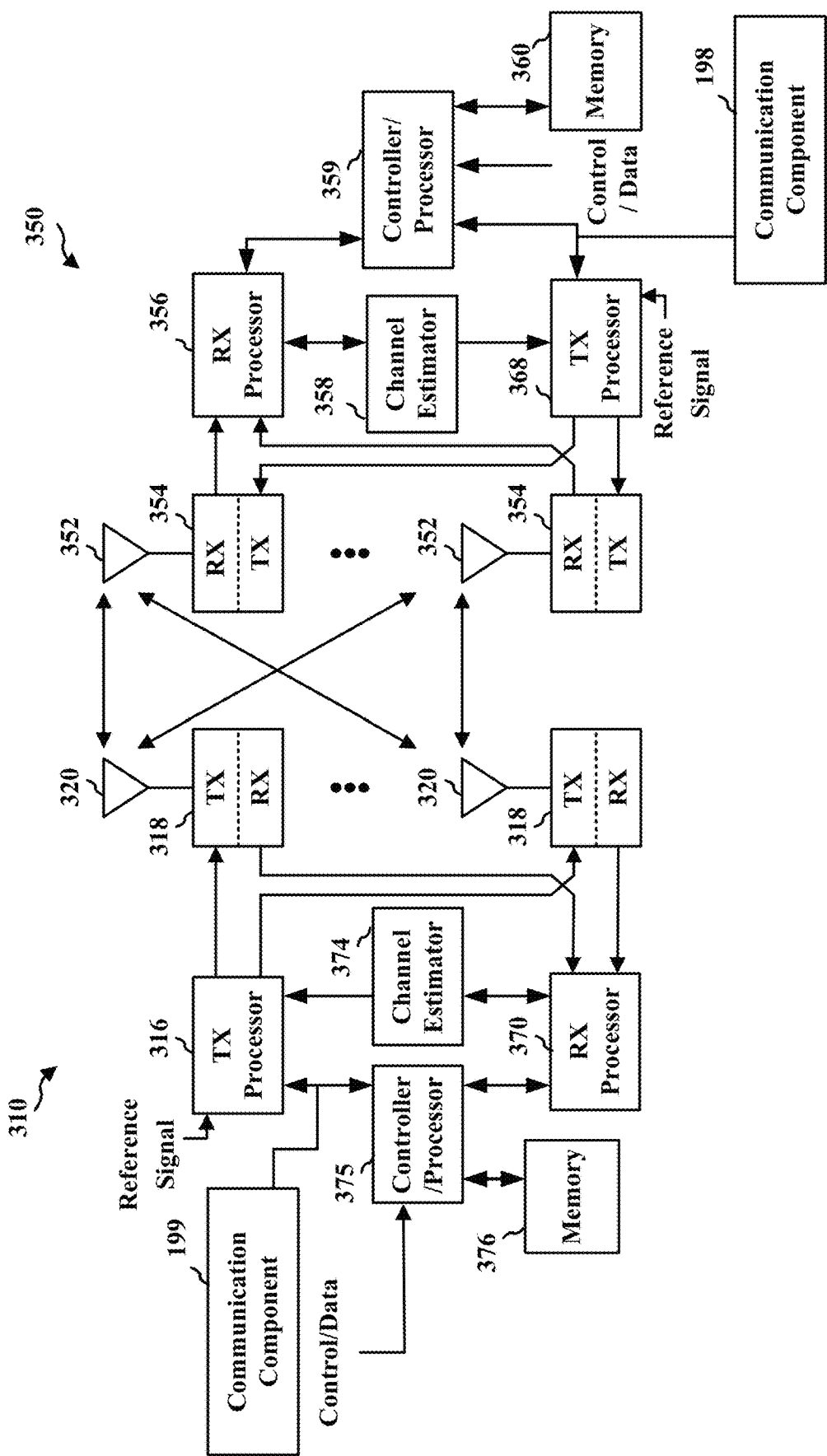
FIG. 3 is a diagram illustrating an example of a base station and user equipment (UE) in an access network.

FIG. 3 is a block diagram of a base station 310 in communication with a UE 350 in an access network, where the base station 310 may be an example implementation of base station 102 and where UE 350 may be an example implementation of UE 104. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with communication component 198 of FIG. 1.

At least one of the TX processor 316, the RX processor 370, and the controller/processor 375 may be configured to perform aspects in connection with communication component 199 of FIG. 1.

Referring to FIGS. 4-15, the described features generally relate to synchronization signal block (SSB) enhancements for fine time-frequency estimation in 5G New Radio (NR). For example, in NR FR1 and FR2, only some combinations of the SSB and data are permitted. In this example, the ratio of SSB/data numerology is 0.5, 1, or 2. The combinations are further described in detail in Table 1 below:

TABLE 1

| SSB Numerology | Frequency Range | # of SSB locations | RMSI-SIB1/Msg2 to 4 for init.acq/Paging/Other-SI Numerology | Data numerology (candidates supported) | Comments |
| --- | --- | --- | --- | --- | --- |
| 15 kHz | <3 GHz in FR1 | 4 | 15 or 30 KHz | 15, 30, 60 kHz for FR1 | 15, 30 kHz SCS used for implementation currently for data |
| 30 kHz - Type I & II | <3 GHz in FR1 | 4 | 15 or 30 KHz | | |
| | >3 GHz (2.4 GHz in one scenario) in FR1 | 8 | 15 or 30 kHz | | |
| 120 kHz/ 240 kHz | FR2 only | 64 | 60 or 120 kHz | 60 kHz or 120 kHz for FR2 | 120 kHz SCS used for implementation currently for data |

In an aspect, for FR4 (e.g., a frequency greater than 52.6 GHz band), the SCS for data and SSB need to be scaled up. For example, scaling is needed for data to cover a wide bandwidth (e.g., 2 GHz bandwidth or above), but scaling up of SSB may translate to searcher difficulty. There are several combinations of SSB and data numerology being considered (e.g., 120/240 kHz/480/960 kHz SSB SCS and 480/960 kHz/1.92 MHz/3.84 MHz data SCS). The ratio between data and SSB numerology may be much larger than 2. This is done to keep searcher complexity manageable for the initial search. For NR, additional SSBs may be configured for RRM purpose with a different SCS. Tables 2 and 3 detail the relationship between the SCS and the timing:

TABLE 2

| SSB SCS | SSB BW (240 tones) | Timing Resolution from SSB |
| --- | --- | --- |
| 120 kHz | 28.8 MHz | 34.72 ns |
| 240 kHz | 57.6 MHz | 17.36 ns |
| 480 kHz | 115.2 MHz | 8.68 ns |
| 960 kHz | 230.4 MHz | 4.34 ns |

TABLE 3

| RMSI SCS | RMSI symbol duration | RMSI CP duration (7%) | Comments |
| --- | --- | --- | --- |
| 480 kHz | 2082 ns | ~145 ns | |
| 960 kHz | 1041 ns | ~72 ns | |
| 1.92 MHz | 520.8 ns | ~36 ns | CP duration = Resolution from 120 kHz SCS |
| 3.84 MHz | 260.4 ns | ~18 ns | CP duration = Resolution from 240 kHz SCS |

The present disclosure relates generally to current issues surrounding sample/symbol timing obtained from SSB. For example, in an aspect, the present disclosure includes a method, apparatus, and non-statutory computer readable medium for wireless communications for improving enhancements to the SSB to improve the timing search. The aspects include generating, by a network entity for a UE, a SSB and an additional RS based on a variable function of a SSB SCS for communication after initial acquisition; and transmitting, by the network entity to the UE, the SSB including the additional RS. The aspects further include receiving, by a UE from a network entity, a SSB and an additional RS based on a variable function of a SSB SCS for communication after initial acquisition; and decoding, by the UE, the SSB including the additional RS.

Figure 4:
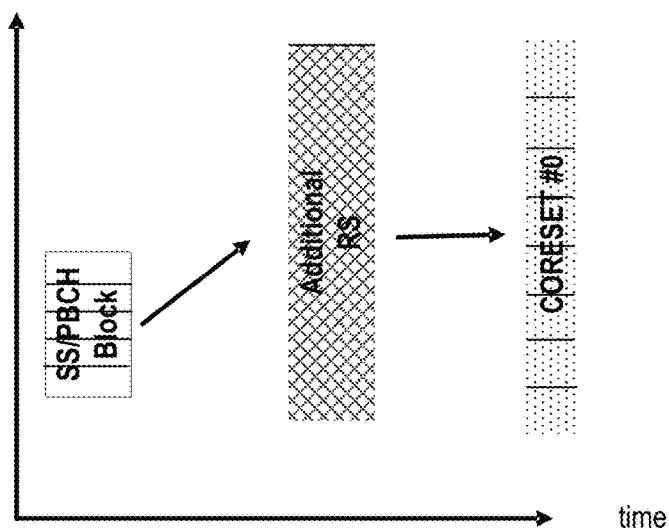
FIG. 4 is a diagram illustrating an example of a transmission pattern of an additional RS for symbol/sample timing.
Figure 4:
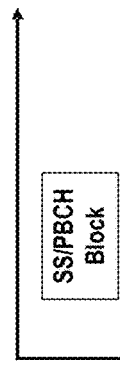
Figure 4:
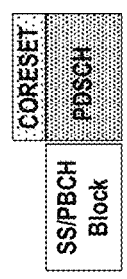
Figure 4:
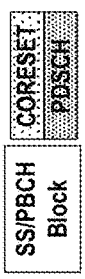

FIG. 4 is a diagram illustrating an example of a transmission pattern of an additional RS for symbol/sample timing. For example, diagram 400 illustrates transmitting an additional RS between SS/PBCH block and CORESET #0. In an aspect, currently in Release 15, the PBCH indicates the SCS used for RMSI, the CORESET is 1, 2, or 3 symbols long, and SSB is 4 symbols (e.g., PSS/PBCH/SSS/PBCH). Diagram 400 illustrates the additional RS being transmitted if the SCS ratio of RMSI over SSB satisfies a threshold. In an example, the ratio can be 0.5, 1, 2, 4, 8, 16, and 32, in which the additional RS may be used when the ratio is greater than 8. The additional RS bandwidth and numerology may be a function of the SSB SCS and RMSI SCS. The additional RS bandwidth may be equal or at least within a frequency range to the CORESET #0 bandwidth to provide enough timing recovery resolution. Further, the PBCH carries information pointing to additional RS time and/or frequency domain location, SCS, and/or pattern. In some instances, the information may be implied by CORESET #0 configuration instead of being explicitly indicated.

In an aspect, diagram 450 illustrates patterns 1, 2, and 3 of the SS/PBCH Block, CORESET, and PDSCH. For example, in pattern 1 of diagram 450, the SS/PBCH block may have the same bandwidth as CORESET and PDSCH, but may be transmitted before both. For pattern 2, the CORESET and PDSCH may have the same bandwidth while the SS/PBCH block has a different bandwidth. However, the PDSCH may be transmitted at the same time as the SS/PBCH block. For pattern 3, the CORESET and PDSCH may have the same bandwidth while the SS/PBCH block has a different bandwidth. However, the SS/PBCH block, CORESET, and PDSCH may all be transmitted at the same time.

Figure 5:
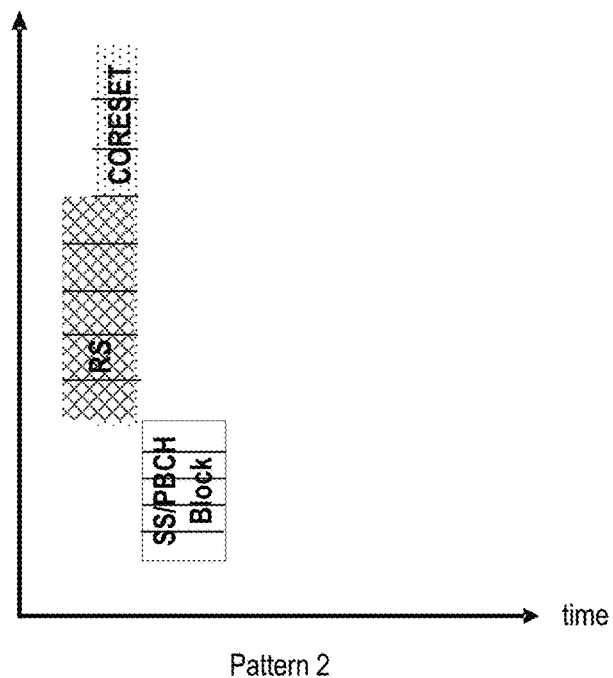
FIG. 5 is a diagram illustrating an example of another transmission pattern of an additional RS for symbol/sample timing.
Figure 5:
Figure 5:
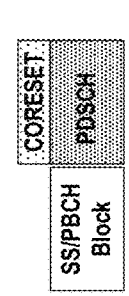
Figure 5:

FIG. 5 is a diagram illustrating an example of another transmission pattern of an additional RS for symbol/sample timing. For example, diagram 500 illustrates transmitting an additional RS along with the SS/PBCH block and CORESET #0. In some aspects, the additional RS bandwidth and numerology is a function of the SSB SCS and the RMSI SCS. The PBCH indicates the SCS used for RMSI. In an example, if the ratio between the SSB SCS and the RMSI SCS (e.g., ratio of RMSI SCS over SSB SCS) is larger than a threshold, the a larger bandwidth (e.g., wideband) is used. The ratio can be 0.5, 1, 2, 4, 8, 16, and 32. In some aspects, the numerology of the additional RS can be a function of the ratio between the SSB SCS and the RMSI SCS. As described herein, diagram 500 depicts that the additional RS may be transmitted inside/outside of the RMSI (i.e., CORESET #0 block) in a frequency greater than the SS/PBCH block, but at a time before the SS/PBCH block.

In an aspect, diagram 550 illustrates patterns 1, 2, and 3 of the SS/PBCH Block, CORESET, and PDSCH. For example, in pattern 1 of diagram 550, the SS/PBCH block may have the same bandwidth as CORESET and PDSCH, but may be transmitted before both. For pattern 2, the CORESET and PDSCH may have the same bandwidth while the SS/PBCH block has a different bandwidth. However, the PDSCH may be transmitted at the same time as the SS/PBCH block. For pattern 3, the CORESET and PDSCH may have the same bandwidth while the SS/PBCH block has a different bandwidth. However, the SS/PBCH block, CORESET, and PDSCH may all be transmitted at the same time.

Figure 6:
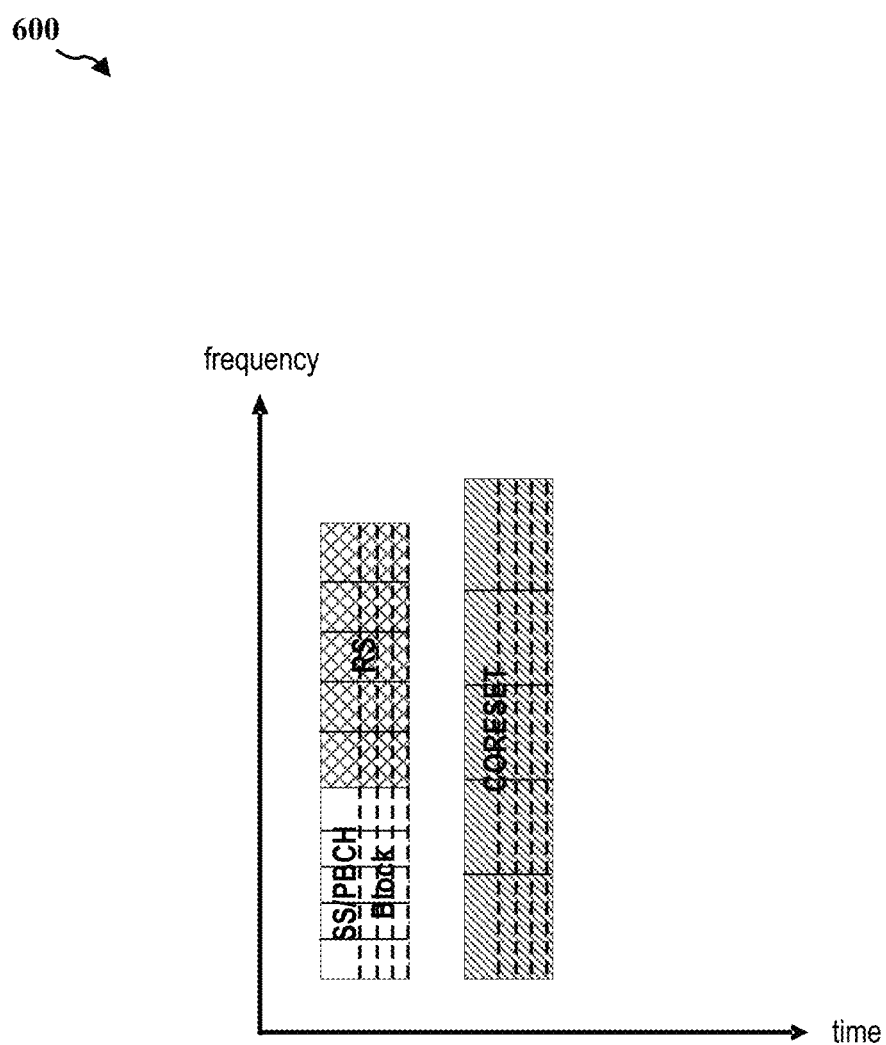
FIG. 6 is a diagram illustrating an example of a transmission pattern of an additional RS with a corresponding numerology as a SSB.

FIG. 6 is a diagram illustrating an example of a transmission pattern of an additional RS with a corresponding numerology as a SSB. For example, diagram 600 illustrates a transmission of the additional RS along with the SS/PBCH block and CORESET #0. In some aspects, the additional RS has the same numerology as the SSB (e.g., SS/PBCH block). In this example, the SSB SCS and RMSI SCS are 120 KHz. The additional RS is transmitted together with the SS/PBCH block. The CORESET may be at least one of 1, 2, or 3 symbols times.

Figure 7:
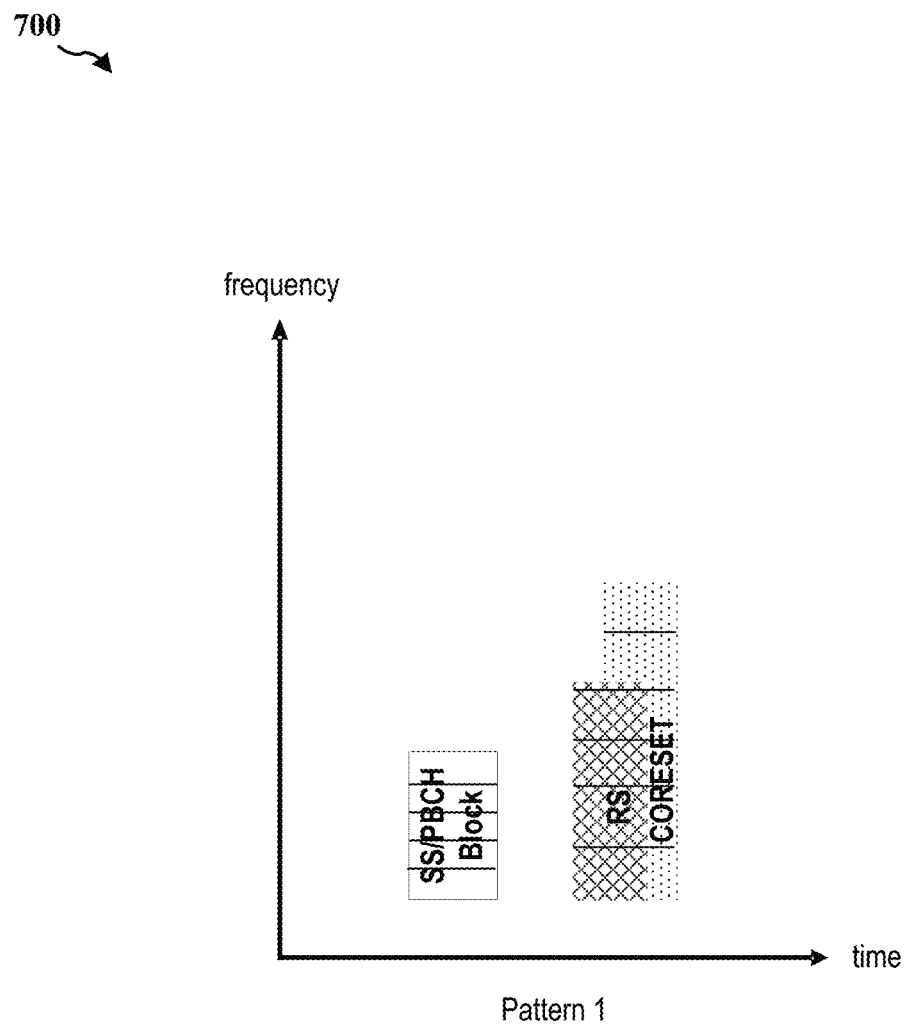
FIG. 7 is a diagram illustrating an example of a transmission pattern of an additional RS with a corresponding numerology as a RMSI.

FIG. 7 is a diagram illustrating an example of a transmission pattern of an additional RS with a corresponding numerology as a RMSI. For example, diagram 700 illustrates a transmission of the additional RS along with the SS/PBCH block and CORESET #0. In some aspects, the additional RS has the same numerology as the RMSI (e.g., CORESET). The additional RS may have the same numerology as the RMSI when the additional RS is multiplexed or transmitted together with RMSI CORESET. The additional RS configuration (e.g., frequency domain) may share a same configuration as CORESET #0 in that the additional RS may cover the same bandwidth as CORESET #0. As described herein, diagram 700 illustrates a scenario in which the SSB SCS is configured at 120 KHz and the additional RS and RMSI are configured at 480 KHz.

Figure 8:
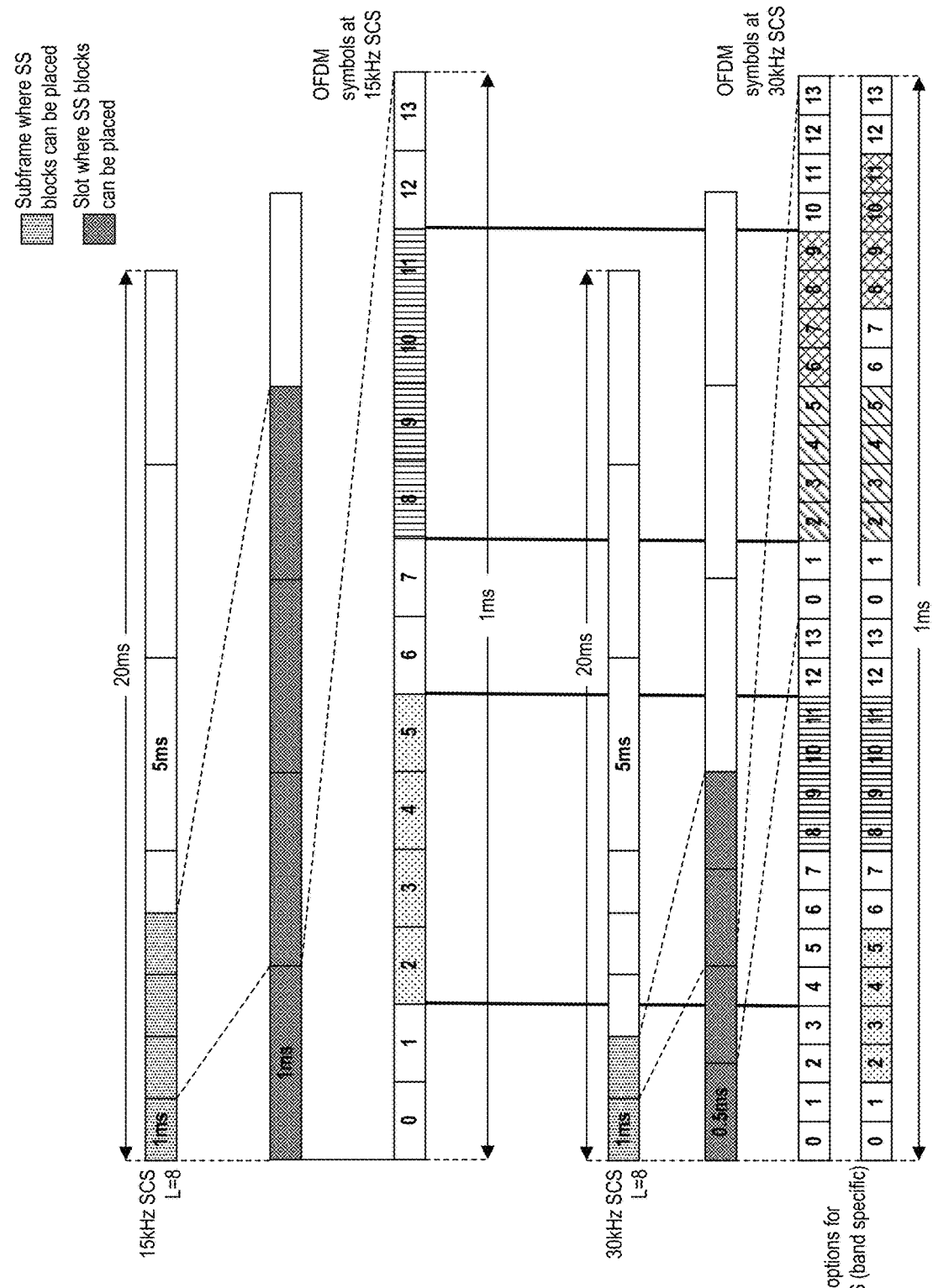
FIG. 8 is a diagram illustrating an example of SSB locations within a half-frame.

FIG. 8 is a diagram illustrating an example of SSB locations within a half-frame. For example, diagram 800 illustrates SSB locations within a 5 ms half-frame for synchronization signals with 15 KHz and 30 KHz SCS. In this example, diagram 800 illustrates subframes where SSBs can be placed and slots where SSBs can be placed.

Figure 9:
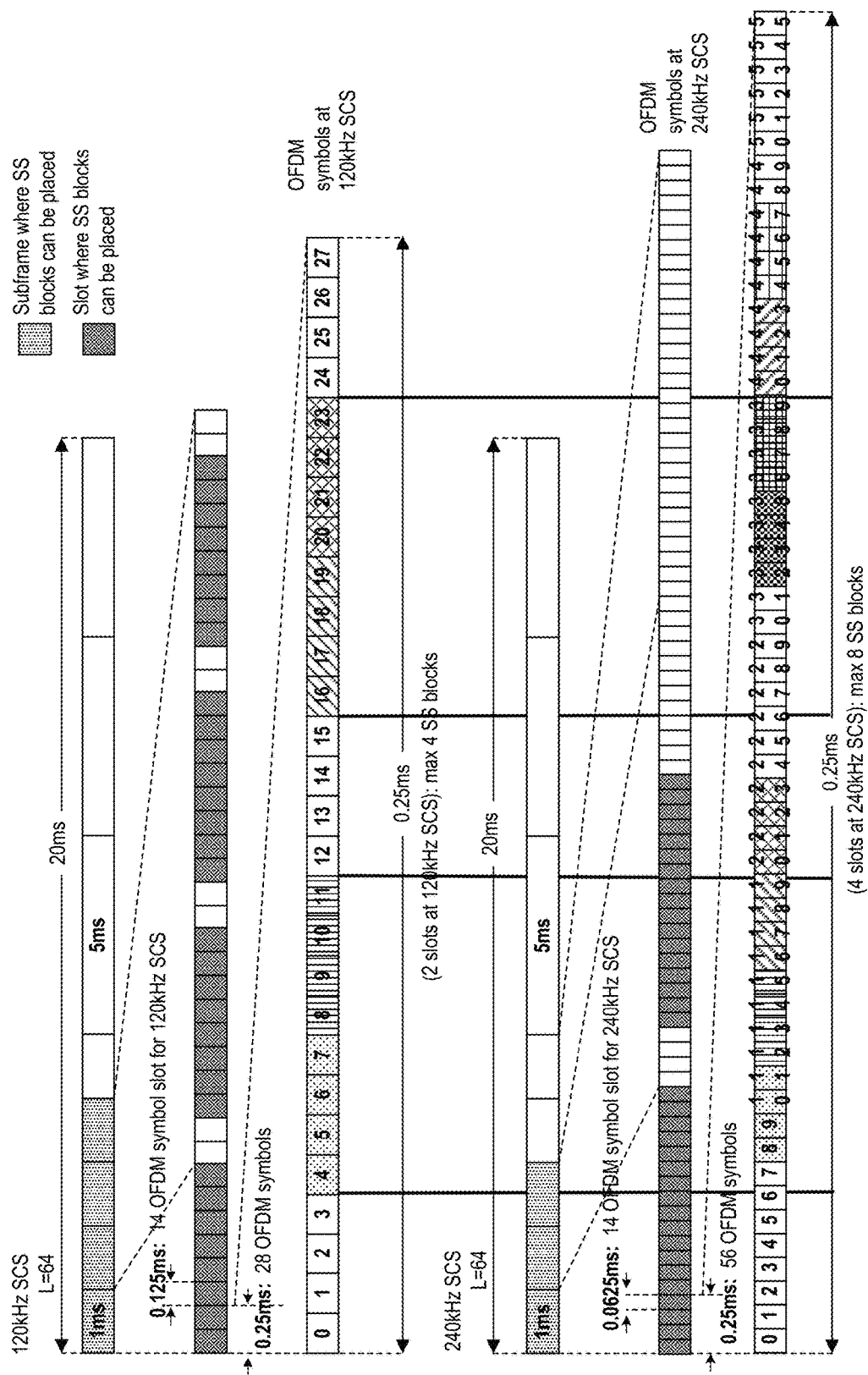
FIG. 9 is a diagram illustrating another example of SSB locations within a half-frame.

FIG. 9 is a diagram illustrating another example of SSB locations within a half-frame. For example, diagram 900 illustrates SSB locations within a 5 ms half-frame for synchronization signals with 120 KHz and 240 KHz SCS. In this example, diagram 900 illustrates subframes where SSBs can be placed and slots where SSBs can be placed.

Figure 10:
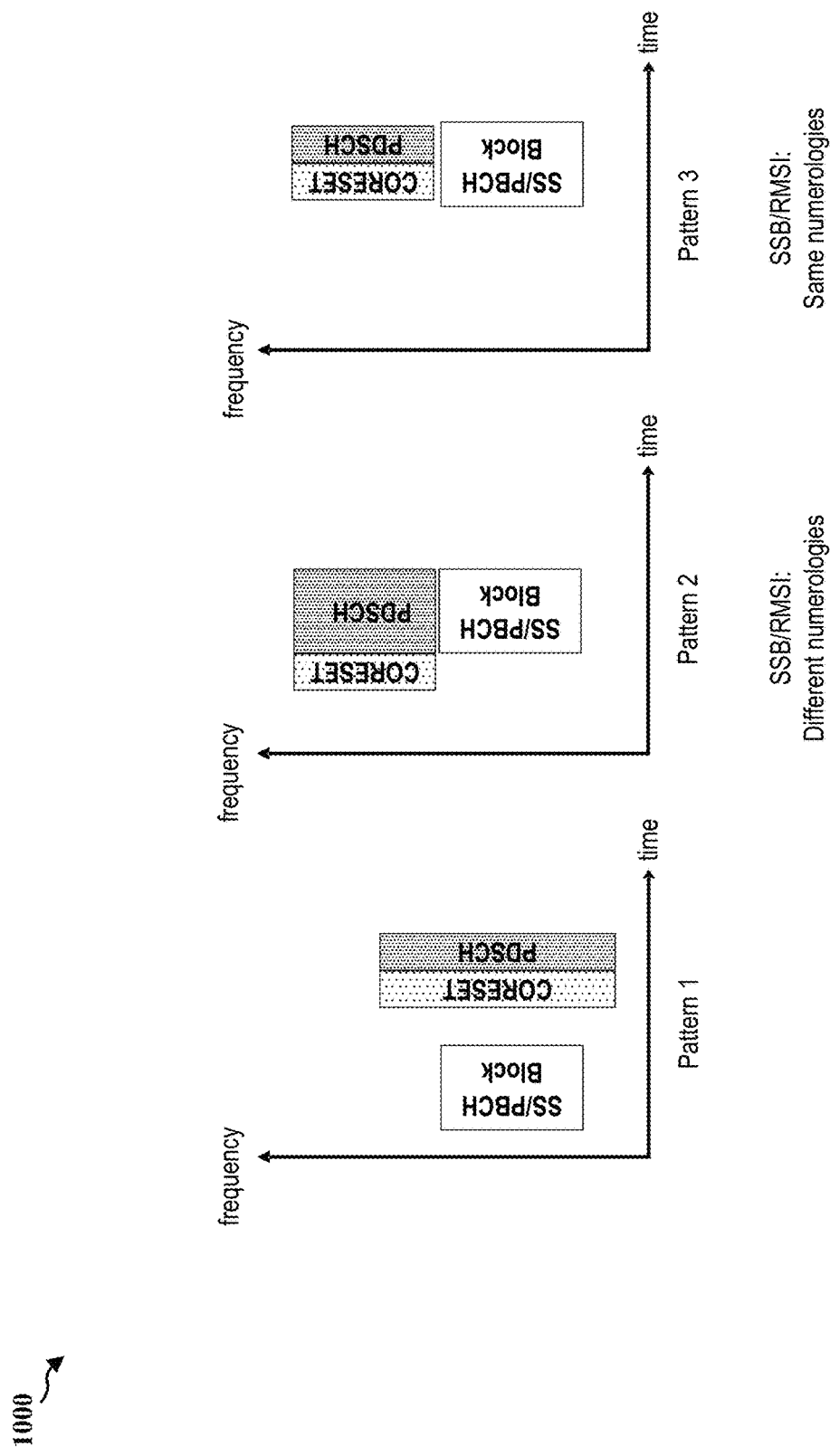
FIG. 10 is a diagram illustrating an example of multiple patterns for RMSI CORESET configurations.

FIG. 10 is a diagram illustrating an example of multiple patterns for RMSI CORESET configurations. For example, diagram 1000 illustrates patterns 1, 2, and 3 depicting various configurations of the SS/PBCH block, CORESET, and PDSCH each with the same and/or different numerologies. In an aspect, in pattern 1 of diagram 1000, the SS/PBCH block may have the same bandwidth as CORESET and PDSCH, but may be transmitted before both. For pattern 2, the CORESET and PDSCH may have the same bandwidth while the SS/PBCH block has a different bandwidth. However, the PDSCH may be transmitted at the same time as the SS/PBCH block. For pattern 3, the CORESET and PDSCH may have the same bandwidth while the SS/PBCH block has a different bandwidth. However, the SS/PBCH block, CORESET, and PDSCH may all be transmitted at the same time.

Figure 11:
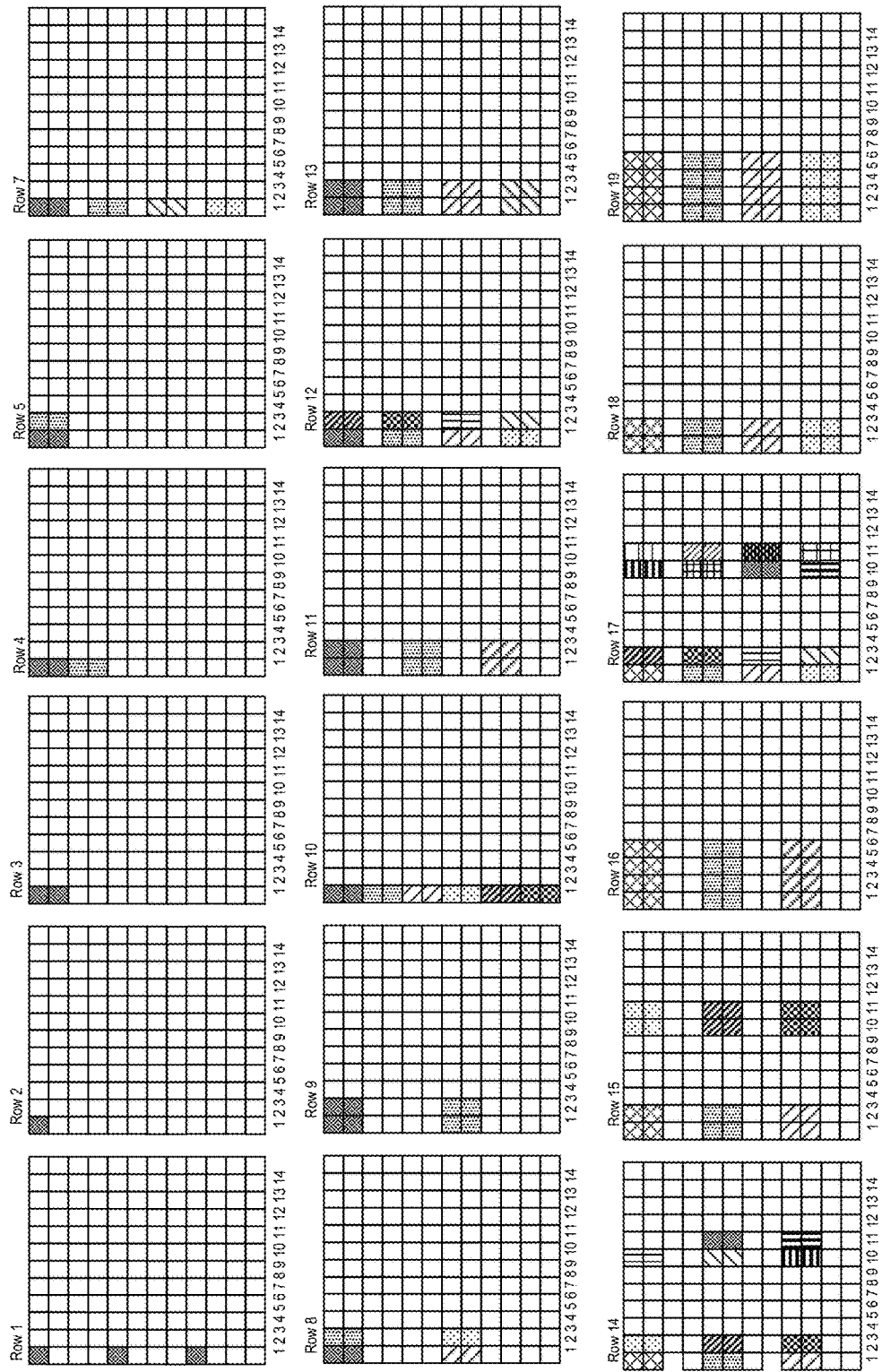
FIG. 11 is a diagram illustrating an example of multiple CSI-RS patterns.

FIG. 11 is a diagram illustrating an example of multiple CSI-RS patterns. For example, diagram 1100 illustrates various CSI-RS patterns in that for a given pattern, different CSI-RS components may be placed anywhere in the RB. For a given pattern, when different CSI-RS components are not shown in adjacent OFDM symbols, they may be placed anywhere in the slot. X-axis: REs in time-domain (OFDM symbols); Y-axis: REs in frequency domain (subcarriers).

Figure 12:
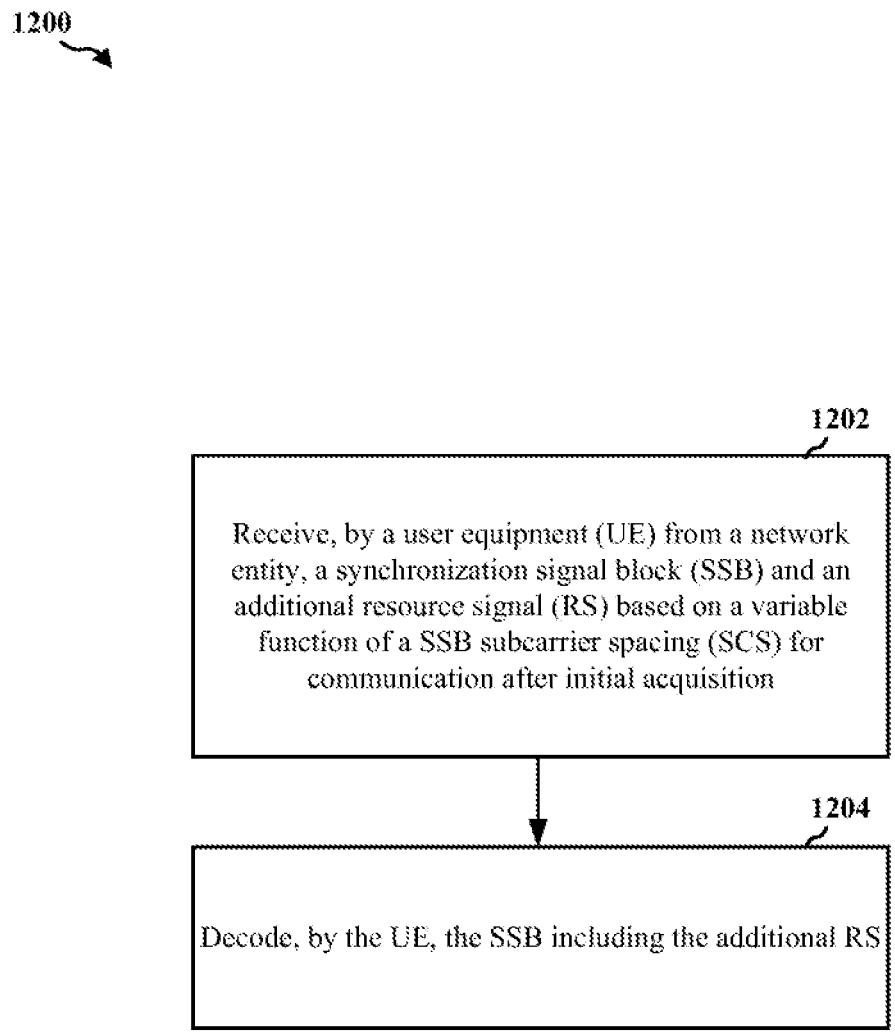
FIG. 12 is a flowchart of a method of wireless communication of an example of decoding an additional SSB with a SSB.

FIG. 12 is a flowchart 1200 of a method of wireless communication. The method may be performed by a UE (e.g., the UE 104; the apparatus 350; the controller/processor 359, which may include the memory 360, processor(s) 1412, which may include the memory 1416, modem 1440 and which may be the entire UE 104 or a component of the UE 104, such as the TX processor 368, the RX processor 356, and/or the transceiver 1402) in combination with the communication component 198/configuration component 240.

At 1202, method 1200 includes receiving, by a user equipment (UE) from a network entity, a synchronization signal block (SSB) and an additional resource signal (RS) based on a variable function of a SSB subcarrier spacing (SCS) for communication after initial acquisition. In an aspect, the UE 104 and/or the communication component 198/configuration component 240 may be configured to receive, by a UE from a network entity, a SSB and an additional RS based on a variable function of a SSB SCS for communication after initial acquisition. As such, the UE 104 and/or the communication component 198/configuration component 240, e.g., in conjunction with controller/processor 359, which may include the memory 360, processor(s) 1412, which may include the memory 1416, modem 1440, TX processor 368, and transceiver 1402 may define a means for receiving, by a user equipment (UE) from a network entity, a SSB and an additional RS based on a variable function of a SSB SCS for communication after initial acquisition.

At 1204, method 1200 includes decoding, by the UE, the SSB including the additional RS. In an aspect, the UE 104 and/or the communication component 198/configuration component 240 may be configured to decode, by the UE, the SSB including the additional RS. As such, the UE 104 and/or the communication component 198/configuration component 240, e.g., in conjunction with controller/processor 359, which may include the memory 360, processor(s) 512, which may include the memory 1416, modem 1440, RX processor 356, and transceiver 1402 may define a means for decoding, by the UE, the SSB including the additional RS.

In an example of method 1200, a numerology of the additional RS corresponds to a numerology of the SSB.

In an example of method 1200, a bandwidth associated with the SSB including the additional RS is fixed based on a CORESET.

In an example of method 1200, a numerology of the additional RS corresponds to a numerology of the RMSI.

In an example of method 1200, a bandwidth associated with the SSB including the additional RS is fixed based on a CORESET.

In an example of method 1200, the additional RS corresponds to at least one of a tracking reference signal (TRS) or a channel state information reference signal (CSI-RS).

In an example of method 1200, decoding the SSB including the additional RS further comprises obtaining multiple shifts of a timing of the SSB based on a physical downlink control channel (PDCCH)/physical downlink shared channel (PDSCH) detection.

Figure 13:
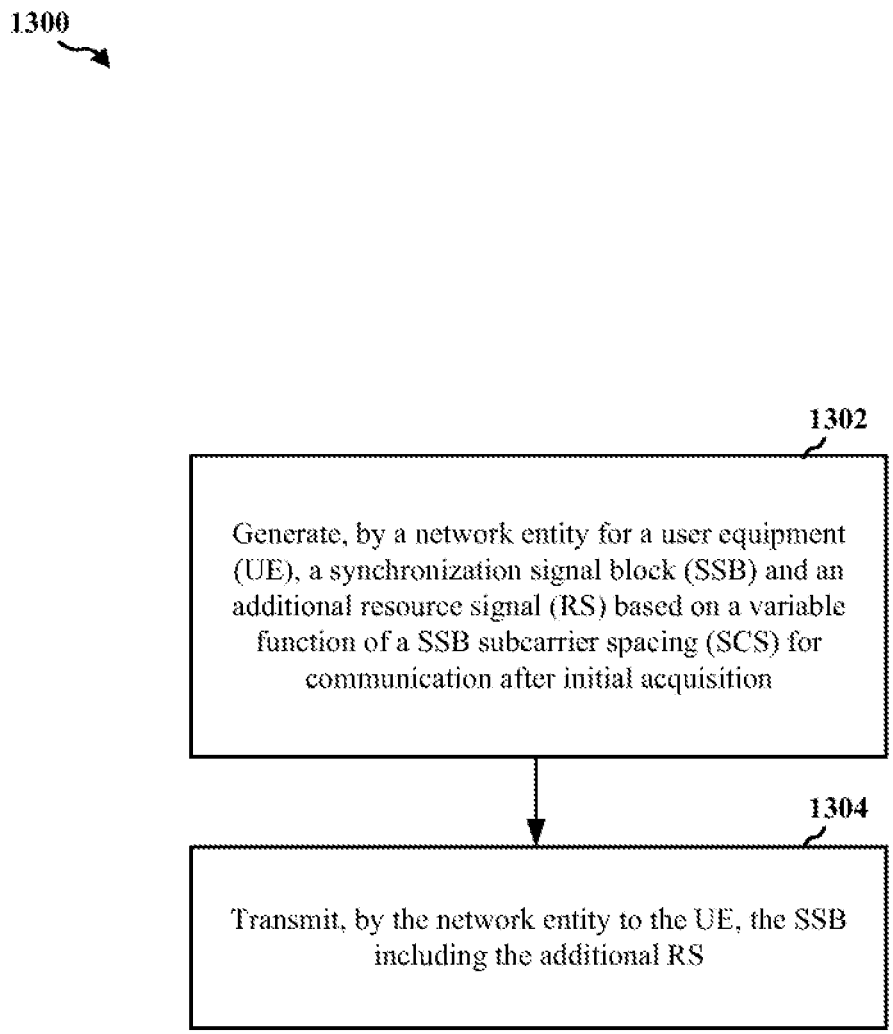
FIG. 13 is a flowchart of a method of wireless communication of an example of generating and transmitting an additional RS with a SSB.

FIG. 13 is a flowchart 1300 of a method of wireless communication. The method may be performed by a network entity (e.g., the base station 102; the apparatus 310; the controller/processor 375, which may include the memory 376, processor(s) 1512, which may include the memory 1516, modem 1540 and which may be the entire base station 102 or a component of the base station 102, such as the TX processor 316, the RX processor 370, and/or the transceiver 1502) in combination with the communication component 199/configuration component 241.

At 1302, method 1300 includes generating, by a network entity for a UE, a SSB and an additional RS based on a variable function of a SSB SCS for communication after initial acquisition. In an aspect, the base station 102 and/or the communication component 199/configuration component 241 may be configured to generate, by a network entity for a UE, a SSB and an additional RS based on a variable function of a SSB SCS for communication after initial acquisition. As such, the base station 102 and/or the communication component 199/configuration component 241, e.g., in conjunction with the controller/processor 375, which may include the memory 376, processor(s) 1512, which may include the memory 1516, modem 1540 and which may be the entire base station 102 or a component of the base station 102, such as the TX processor 316, the RX processor 370, and/or the transceiver 1502 may define a means for generating, by a network entity for a UE, a SSB and an additional RS based on a variable function of a SSB SCS for communication after initial acquisition.

At 1304, method 1300 includes transmitting, by the network entity to the UE, the SSB including the additional RS. In an aspect, the base station 102 and/or the communication component 199/configuration component 241 may be configured to transmit, by the network entity to the UE, the SSB including the additional RS. As such, the base station 102 and/or the communication component 199/configuration component 241, e.g., in conjunction with the controller/processor 375, which may include the memory 376, processor(s) 1512, which may include the memory 1516, modem 1540 and which may be the entire base station 102 or a component of the base station 102, such as the TX processor 316, the RX processor 370, and/or the transceiver 1502 may define a means for transmitting, by the network entity to the UE, the SSB including the additional RS.

In an example of method 1300, a numerology of the additional RS corresponds to a numerology of the SSB.

In an example of method 1300, a bandwidth associated with the SSB including the additional RS is fixed based on a CORESET.

In an example of method 1300, a numerology of the additional RS corresponds to a numerology of the RMSI.

In an example of method 1300, a bandwidth associated with the SSB including the additional RS is fixed based on a CORESET.

In an example of method 1300, the additional RS corresponds to at least one of a TRS or a CSI-RS.

In an example of method 1300, generating the SSB including the additional RS based on the variable function of the SSB SCS and the RMSI SCS further comprises generating the SSB including the additional RS based on a ratio of the RMSI SCS over the SSB SCS.

In an example of method 1300, generating the SSB including the additional RS based on the ratio of the RMSI SCS over the SSB SCS further comprises: determining whether the ratio of the RMSI SCS over the SSB SCS satisfies a threshold; and generating the SSB to include the additional RS based on a determination that the ratio of the RMSI SCS over the SSB SCS satisfies the threshold.

In an example of method 1300, a bandwidth and a numerology of the additional RS are based on the SSB SCS and the RMSI SCS.

In an example of method 1300, transmitting the SSB including the additional RS further comprises transmitting the SSB including the additional RS via a PBCH that carries information corresponding to at least one of a time and frequency domain location, SCS, and a pattern of the additional RS.

In an example of method 1300, wherein generating the SSB including the additional RS based on the variable function of the SSB SCS and the RMSI SCS further comprises: establishing that a DMRS is a wideband DMRS for a PDCCH system information block one (SIB1); and configuring a CORESET to use the wideband DMRS to refine a timing estimation.

In an example, method 1300 includes transmitting a bit in a PBCH indicating the wideband DMRS in the CORESET.

In an example of method 1300, configuring the CORESET to use the wideband DMRS to refine the timing estimation further comprises configuring the CORESET to use the wideband DMRS based on at least one of SSB SCS and RMSI SCS.

Figure 14:
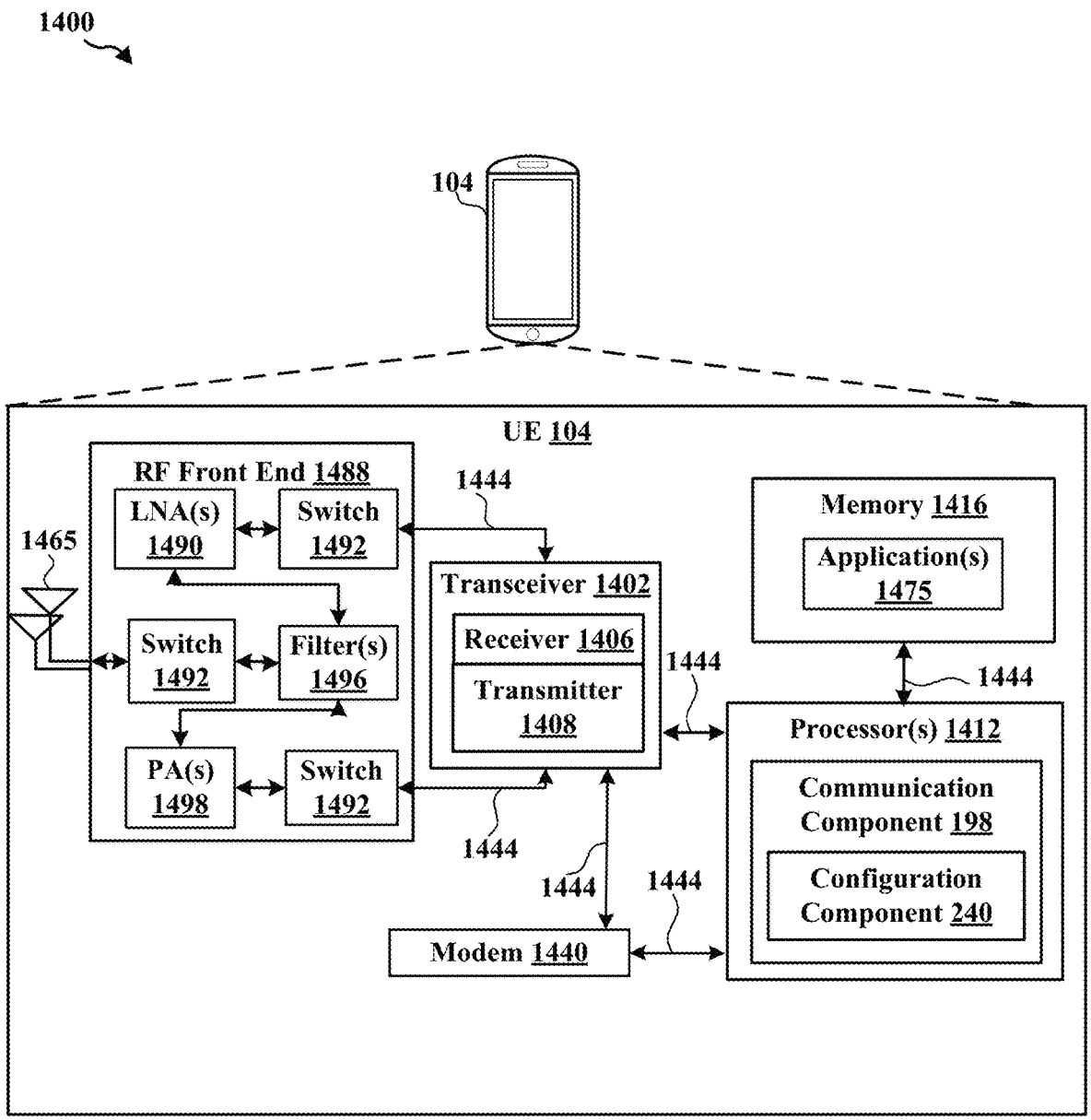
FIG. 14 is a block diagram illustrating an example of a UE, in accordance with various aspects of the present disclosure.

Referring to FIG. 14, one example of an implementation of UE 104 may include a variety of components, some of which have already been described above and are described further herein, including components such as one or more processors 1412 and memory 1416 and transceiver 1402 in communication via one or more buses 1444, which may operate in conjunction with modem 1440 and/or communication component 198 for decoding an additional RS with a SSB.

In an aspect, the one or more processors 1412 can include a modem 1440 and/or can be part of the modem 1440 that uses one or more modem processors. Thus, the various functions related to communication component 198 may be included in modem 1440 and/or processors 1412 and, in an aspect, can be executed by a single processor, while in other aspects, different ones of the functions may be executed by a combination of two or more different processors. For example, in an aspect, the one or more processors 1412 may include any one or any combination of a modem processor, or a baseband processor, or a digital signal processor, or a transmit processor, or a receiver processor, or a transceiver processor associated with transceiver 1402. In other aspects, some of the features of the one or more processors 1412 and/or modem 1440 associated with communication component 198 may be performed by transceiver 1402.

Also, memory 1416 may be configured to store data used herein and/or local versions of applications 1475 or communicating component 1442 and/or one or more of its subcomponents being executed by at least one processor 1412. Memory 1416 can include any type of computer-readable medium usable by a computer or at least one processor 1412, such as random access memory (RAM), read only memory (ROM), tapes, magnetic discs, optical discs, volatile memory, non-volatile memory, and any combination thereof. In an aspect, for example, memory 1416 may be a non-transitory computer-readable storage medium that stores one or more computer-executable codes defining communication component 198 and/or one or more of its subcomponents, and/or data associated therewith, when UE 104 is operating at least one processor 1412 to execute communication component 198 and/or one or more of its subcomponents.

Transceiver 1402 may include at least one receiver 1406 and at least one transmitter 1408. Receiver 1406 may include hardware and/or software executable by a processor for receiving data, the code comprising instructions and being stored in a memory (e.g., computer-readable medium). Receiver 1406 may be, for example, a radio frequency (RF) receiver. In an aspect, receiver 1406 may receive signals transmitted by at least one base station 102. Additionally, receiver 1406 may process such received signals, and also may obtain measurements of the signals, such as, but not limited to, Ec/Io, signal-to-noise ratio (SNR), reference signal received power (RSRP), received signal strength indicator (RSSI), etc. Transmitter 1408 may include hardware and/or software executable by a processor for transmitting data, the code comprising instructions and being stored in a memory (e.g., computer-readable medium). A suitable example of transmitter 1408 may including, but is not limited to, an RF transmitter.

Moreover, in an aspect, UE 104 may include RF front end 1488, which may operate in communication with one or more antennas 1465 and transceiver 1402 for receiving and transmitting radio transmissions, for example, wireless communications transmitted by at least one base station 102 or wireless transmissions transmitted by UE 104. RF front end 1488 may be connected to one or more antennas 1465 and can include one or more low-noise amplifiers (LNAs) 1490, one or more switches 1492, one or more power amplifiers (PAs) 1498, and one or more filters 1496 for transmitting and receiving RF signals.

In an aspect, LNA 1490 can amplify a received signal at a desired output level. In an aspect, each LNA 1490 may have a specified minimum and maximum gain values. In an aspect, RF front end 1488 may use one or more switches 1492 to select a particular LNA 1490 and its specified gain value based on a desired gain value for a particular application.

Further, for example, one or more PA(s) 1498 may be used by RF front end 1488 to amplify a signal for an RF output at a desired output power level. In an aspect, each PA 1498 may have specified minimum and maximum gain values. In an aspect, RF front end 1488 may use one or more switches 1492 to select a particular PA 1498 and its specified gain value based on a desired gain value for a particular application.

Also, for example, one or more filters 1496 can be used by RF front end 1488 to filter a received signal to obtain an input RF signal. Similarly, in an aspect, for example, a respective filter 1496 can be used to filter an output from a respective PA 1498 to produce an output signal for transmission. In an aspect, each filter 1496 can be connected to a specific LNA 1490 and/or PA 1498. In an aspect, RF front end 1488 can use one or more switches 1492 to select a transmit or receive path using a specified filter 1496, LNA 1490, and/or PA 1498, based on a configuration as specified by transceiver 1402 and/or processor 1412.

As such, transceiver 1402 may be configured to transmit and receive wireless signals through one or more antennas 1465 via RF front end 1488. In an aspect, transceiver may be tuned to operate at specified frequencies such that UE 104 can communicate with, for example, one or more base stations 102 or one or more cells associated with one or more base stations 102. In an aspect, for example, modem 1440 can configure transceiver 1402 to operate at a specified frequency and power level based on the UE configuration of the UE 104 and the communication protocol used by modem 1440.

In an aspect, modem 1440 can be a multiband-multimode modem, which can process digital data and communicate with transceiver 1402 such that the digital data is sent and received using transceiver 1402. In an aspect, modem 1440 can be multiband and be configured to support multiple frequency bands for a specific communications protocol. In an aspect, modem 1440 can be multimode and be configured to support multiple operating networks and communications protocols. In an aspect, modem 1440 can control one or more components of UE 104 (e.g., RF front end 1488, transceiver 1402) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, the processor(s) 1412 may correspond to one or more of the processors described in connection with the UE in FIG. 3. Similarly, the memory 1416 may correspond to the memory described in connection with the UE in FIG. 3.

Figure 15:
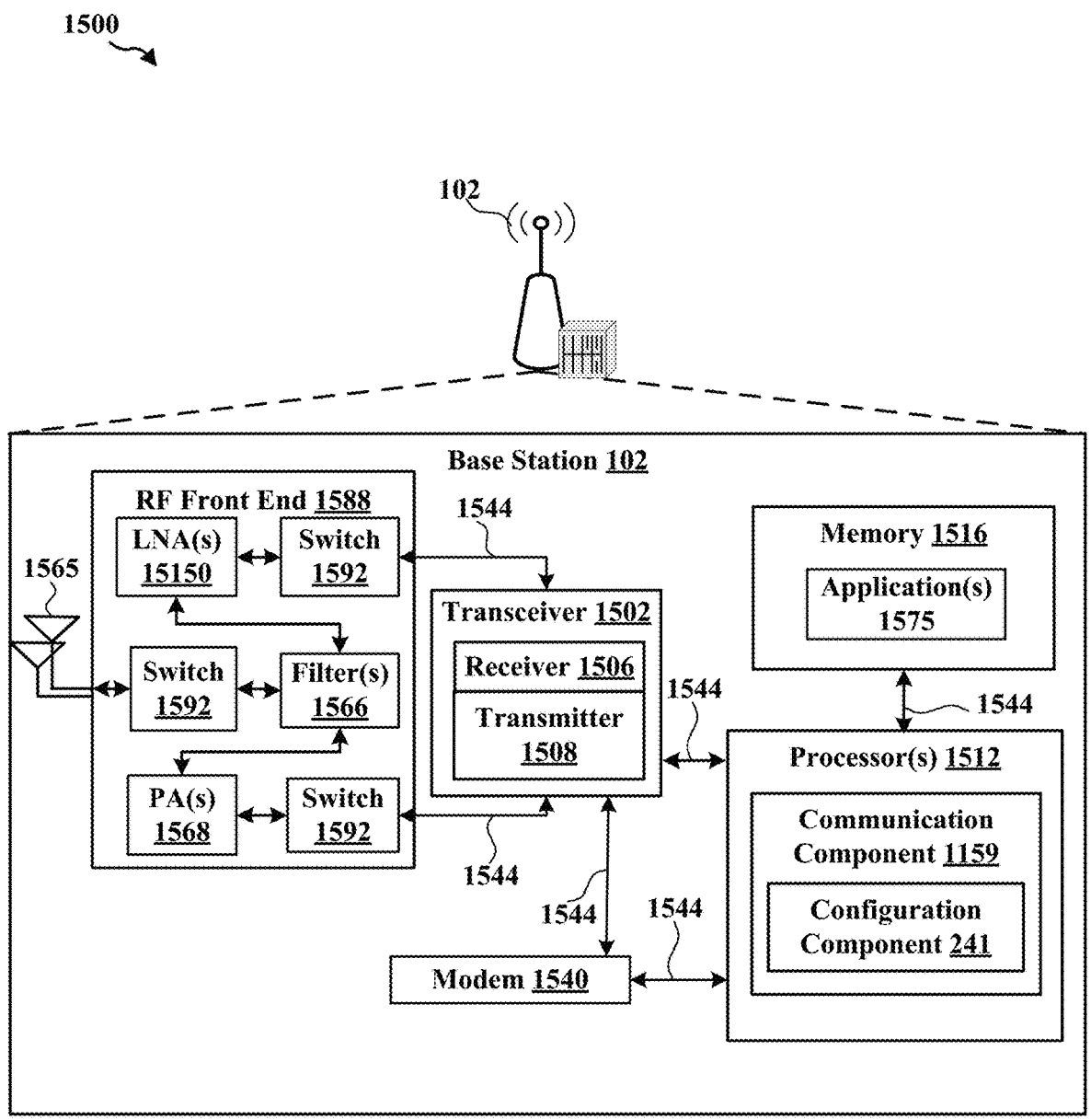
FIG. 15 is a block diagram illustrating an example of a base station, in accordance with various aspects of the present disclosure.

Referring to FIG. 15, one example of an implementation of base station 102 (e.g., a base station 102, as described above) may include a variety of components, some of which have already been described above, but including components such as one or more processors 1512 and memory 1516 and transceiver 1502 in communication via one or more buses 1544, which may operate in conjunction with modem 1540 and communication component 199 for communicating reference signals.

The transceiver 1502, receiver 1506, transmitter 1508, one or more processors 1512, memory 1516, applications 1575, buses 1544, RF front end 1588, LNAs 1590, switches 1592, filters 1596, PAs 1598, and one or more antennas 1565 may be the same as or similar to the corresponding components of UE 104, as described above, but configured or otherwise programmed for base station operations as opposed to UE operations.

In an aspect, the processor(s) 1512 may correspond to one or more of the processors described in connection with the base station in FIG. 3. Similarly, the memory 1516 may correspond to the memory described in connection with the base station in FIG. 3.

Some Further Example Clauses

Implementation examples are described in the following numbered clauses:

1. A method of wireless communication, comprising:
   generating, by a network entity for a user equipment (UE), a synchronization signal block (SSB) and an additional resource signal (RS) based on a variable function of a SSB subcarrier spacing (SCS) for communication after initial acquisition; and
   transmitting, by the network entity to the UE, the SSB including the additional RS.
2. The method of clause 1, wherein a numerology of the additional RS corresponds to a numerology of the SSB.
3. The method of clause 2, wherein a bandwidth associated with the SSB including the additional RS is fixed based on a control resource set (CORESET).
4. The method of clause 1, a numerology of the additional RS corresponds to a numerology of a remaining minimum system information (RMSI).
5. The method of clause 4, wherein a bandwidth associated with the SSB including the additional RS is fixed based on a control resource set (CORESET).
6. The method of clause 4, wherein the additional RS corresponds to at least one of a tracking reference signal (TRS) or a channel state information reference signal (CSI-RS).
7. The method of clause 1, wherein generating the SSB including the additional RS based on the variable function of the SSB SCS and the RMSI SCS further comprises generating the SSB including the additional RS based on a ratio of the RMSI SCS over the SSB SCS.
8. The method of clause 7, wherein generating the SSB including the additional RS based on the ratio of the RMSI SCS over the SSB SCS further comprises:
   determining whether the ratio of the RMSI SCS over the SSB SCS satisfies a threshold; and
   generating the SSB to include the additional RS based on a determination that the ratio of the RMSI SCS over the SSB SCS satisfies the threshold.
9. The method of clause 1, wherein a bandwidth and a numerology of the additional RS are based on the SSB SCS and the RMSI SCS.
10. The method of clause 1, wherein transmitting the SSB including the additional RS further comprises transmitting the SSB including the additional RS via a physical broadcast channel (PBCH) that carries information corresponding to at least one of a time and frequency domain location, SCS, and a pattern of the additional RS.
11. The method of clause 1, wherein generating the SSB including the additional RS based on the variable function of the SSB SCS and the RMSI SCS further comprises:
   establishing that a demodulated reference signal (DMRS) is a wideband DMRS for a physical downlink control channel (PDCCH) system information block one (SIB1); and
   configuring a control resource set (CORESET) to use the wideband DMRS to refine a timing estimation.

12. The method of clause 11, further comprising transmitting a bit in a physical broadcast channel (PBCH) indicating the wideband DMRS in the CORESET.

13. The method of clause 11, wherein configuring the CORESET to use the wideband DMRS to refine the timing estimation further comprises configuring the CORESET to use the wideband DMRS based on at least one of SSB SCS and RMSI SCS.

14. A method of wireless communication, comprising:
receiving, by a user equipment (UE) from a network entity, a synchronization signal block (SSB) and an additional resource signal (RS) based on a variable function of a SSB subcarrier spacing (SCS) for communication after initial acquisition; and
decoding, by the UE, the SSB including the additional RS.

15. The method of clause 14, wherein a numerology of the additional RS corresponds to a numerology of the SSB.

16. The method of clause 15, wherein a bandwidth associated with the SSB including the additional RS is fixed based on a control resource set (CORESET).

17. The method of clause 14, a numerology of the additional RS corresponds to a numerology of the RMSI.

18. The method of clause 17, wherein a bandwidth associated with the SSB including the additional RS is fixed based on a control resource set (CORESET).

19. The method of clause 17, wherein the additional RS corresponds to at least one of a tracking reference signal (TRS) or a channel state information reference signal (CSI-RS).

20. The method of clause 14, wherein decoding the SSB including the additional RS further comprises obtaining multiple shifts of a timing of the SSB based on a physical downlink control channel (PDCCH)/physical downlink shared channel (PDSCH) detection.

21. An apparatus for wireless communication, comprising:
a transceiver;
a memory configured to store instructions; and
one or more processors communicatively coupled with the transceiver and the memory, wherein the one or more processors are configured to:
generate, by a network entity for a user equipment (UE), a synchronization signal block (SSB) and an additional resource signal (RS) based on a variable function of a SSB subcarrier spacing (SCS) for communication after initial acquisition; and
transmit, by the network entity to the UE, the SSB including the additional RS.

22. The apparatus of clause 21, wherein a numerology of the additional RS corresponds to a numerology of the SSB, and wherein a bandwidth associated with the SSB including the additional RS is fixed based on a control resource set (CORESET).

23. The apparatus of clause 21, wherein a numerology of the additional RS corresponds to a numerology of the RMSI, wherein a bandwidth associated with the SSB including the additional RS is fixed based on a control resource set (CORESET), and wherein the additional RS corresponds to at least one of a tracking reference signal (TRS) or a channel state information reference signal (CSI-RS).

24. The apparatus of clause 21, wherein the one or more processors configured to generate the SSB including the additional RS based on the variable function of the SSB SCS and the RMSI SCS are further configured to generate the SSB including the additional RS based on a ratio of the RMSI SCS over the SSB SCS.

25. The apparatus of clause 1, wherein the one or more processors configured to transmit the SSB including the additional RS are further configured to transmit the SSB including the additional RS via a physical broadcast channel (PBCH) that carries information corresponding to at least one of a time and frequency domain location, SCS, and a pattern of the additional RS.

26. The apparatus of clause 21, wherein the one or more processors configured to generate the SSB including the additional RS based on the variable function of the SSB SCS and the RMSI SCS are further configured to:
establish that a demodulated reference signal (DMRS) is a wideband DMRS for a physical downlink control channel (PDCCH) system information block one (SIB1);
configure a control resource set (CORESET) to use the wideband DMRS to refine a timing estimation based on at least one of SSB SCS and RMSI SCS; and
transmit a bit in a physical broadcast channel (PBCH) indicating the wideband DMRS in the CORESET.

27. An apparatus for wireless communication, comprising:
a transceiver;
a memory configured to store instructions; and
one or more processors communicatively coupled with the transceiver and the memory, wherein the one or more processors are configured to:
receive, by a user equipment (UE) from a network entity, a synchronization signal block (SSB) and an additional resource signal (RS) based on a variable function of a SSB subcarrier spacing (SCS) for communication after initial acquisition; and
decode, by the UE, the SSB including the additional RS.

28. The apparatus of clause 27, wherein a numerology of the additional RS corresponds to a numerology of the SSB, and wherein a bandwidth associated with the SSB including the additional RS is fixed based on a control resource set (CORESET).

29. The apparatus of clause 27, wherein a numerology of the additional RS corresponds to a numerology of the RMSI, wherein a bandwidth associated with the SSB including the additional RS is fixed based on a control resource set (CORESET), and wherein the additional RS corresponds to at least one of a tracking reference signal (TRS) or a channel state information reference signal (CSI-RS).

30. The apparatus of clause 14, wherein the one or more processors configured to decode the SSB including the additional RS are further configured to obtain multiple shifts of a timing of the SSB based on a physical downlink control channel (PDCCH)/physical downlink shared channel (PDSCH) detection.

31. An apparatus for wireless communication, comprising means for performing the operations of one or more methods in clauses 1-20.

32. A non-transitory computer-readable medium, comprising code executable by one or more processors to perform the operations of one or more methods in clauses 1-20.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a network entity, comprising:
    determining whether a ratio of a remaining minimum system information (RMSI) subcarrier spacing (SCS) over a synchronization signal block (SSB) SCS for communication after initial acquisition satisfies a threshold;
    generating a SSB including an additional resource signal (RS) for a user equipment (UE) based on a determination that the ratio of the RMSI SCS over the SSB SCS satisfies the threshold; and
    transmitting the SSB including the additional RS to the UE.

2. The method of claim 1, wherein a first numerology of the additional RS corresponds to a second numerology of the SSB.

3. The method of claim 2, wherein a bandwidth associated with the SSB including the additional RS is fixed based on a control resource set (CORESET).

4. The method of claim 1, a first numerology of the additional RS corresponds to a second numerology of a RMSI.

5. The method of claim 4, wherein a bandwidth associated with the SSB including the additional RS is fixed based on a control resource set (CORESET).

6. The method of claim 4, wherein the additional RS corresponds to at least one of a tracking reference signal (TRS) or a channel state information reference signal (CSI-RS).

7. The method of claim 1, wherein a bandwidth and a numerology of the additional RS are based on the SSB SCS and the RMSI SCS.

8. The method of claim 1, wherein transmitting the SSB including the additional RS further comprises transmitting the SSB including the additional RS via a physical broadcast channel (PBCH) that carries information corresponding to at least one of a time and frequency domain location, an SCS, and a pattern of the additional RS.

9. The method of claim 1, wherein generating the SSB including the additional RS based on a variable function of the SSB SCS and the RMSI SCS further comprises:
    establishing that a demodulated reference signal (DMRS) is a wideband DMRS for a physical downlink control channel (PDCCH) system information block one (SIB1); and
    configuring a control resource set (CORESET) to use the wideband DMRS to refine a timing estimation.

10. The method of claim 9, further comprising transmitting a bit in a physical broadcast channel (PBCH) indicating the wideband DMRS in the CORESET.

11. The method of claim 9, wherein configuring the CORESET to use the wideband DMRS to refine the timing estimation further comprises configuring the CORESET to use the wideband DMRS based on at least one of SSB SCS and the RMSI SCS.

12. A method of wireless communication at a user equipment (UE), comprising:
    receiving, from a network entity, a synchronization signal block (SSB) including an additional resource signal (RS) based on a variable function of a SSB subcarrier spacing (SCS) for communication after initial acquisition, the additional RS being a function of the SSB SCS and a remaining minimum system information (RMSI) SCS; and
    decoding the SSB including the additional RS.

13. The method of claim 12, wherein a first numerology of the additional RS corresponds to a second numerology of the SSB.

14. The method of claim 13, wherein a bandwidth associated with the SSB including the additional RS is fixed based on a control resource set (CORESET).

15. The method of claim 12, a first numerology of the additional RS corresponds to a second numerology of a RMSI.

16. The method of claim 15, wherein a bandwidth associated with the SSB including the additional RS is fixed based on a control resource set (CORESET).

17. The method of claim 15, wherein the additional RS corresponds to at least one of a tracking reference signal (TRS) or a channel state information reference signal (CSI-RS).

18. The method of claim 12, wherein decoding the SSB including the additional RS further comprises obtaining multiple shifts of a timing of the SSB based on a physical downlink control channel (PDCCH)/physical downlink shared channel (PDSCH) detection.

19. An apparatus for wireless communication at a network entity, comprising:
    a transceiver;
    a memory configured to store instructions; and one or more processors communicatively coupled with the transceiver and the memory, wherein the one or more processors are configured to:
- determine whether a ratio of a remaining minimum system information (RMSI) subcarrier spacing (SCS) over a synchronization signal block (SSB) SCS for communication after initial acquisition satisfies a threshold;
- generate the SSB including an additional resource signal (RS) based determination that the ratio of the RMSI SCS over the SSB SCS satisfies the threshold; and
- transmit, to a user equipment (UE), the SSB including the additional RS.

20. The apparatus of claim 19, wherein a first numerology of the additional RS corresponds to a second numerology of the SSB, and wherein a bandwidth associated with the SSB including the additional RS is fixed based on a control resource set (CORESET).

21. The apparatus of claim 19, wherein a first numerology of the additional RS corresponds to a second numerology of a RMSI, wherein a bandwidth associated with the SSB including the additional RS is fixed based on a control resource set (CORESET), and wherein the additional RS corresponds to at least one of a tracking reference signal (TRS) or a channel state information reference signal (CSI-RS).

22. The apparatus of claim 19, wherein the one or more processors configured to transmit the SSB including the additional RS are further configured to transmit the SSB including the additional RS via a physical broadcast channel (PBCH) that carries information corresponding to at least one of a time and frequency domain location, SCS, and a pattern of the additional RS.

23. The apparatus of claim 19, wherein the one or more processors configured to generate the SSB including the additional RS based on a variable function of the SSB SCS and the RMSI SCS are further configured to:
- establish that a demodulated reference signal (DMRS) is a wideband DMRS for a physical downlink control channel (PDCCH) system information block one (SIB1);
- configure a control resource set (CORESET) to use the wideband DMRS to refine a timing estimation based on at least one of SSB SCS and RMSI SCS; and
- transmit a bit in a physical broadcast channel (PBCH) indicating the wideband DMRS in the CORESET.

24. An apparatus for wireless communication at a user equipment (UE), comprising:
- a transceiver;
- a memory configured to store instructions; and
- one or more processors communicatively coupled with the transceiver and the memory, wherein the one or more processors are configured to:
  - receive, from a network entity, a synchronization signal block (SSB) including an additional resource signal (RS) based on a variable function of a SSB subcarrier spacing (SCS) for communication after initial acquisition, the additional RS being a function of the SSB SCS and a remaining minimum system information (RMSI) SCS; and
  - decode, by the UE, the SSB including the additional RS.

25. The apparatus of claim 24, wherein a first numerology of the additional RS corresponds to a second numerology of the SSB, and wherein a bandwidth associated with the SSB including the additional RS is fixed based on a control resource set (CORESET).

26. The apparatus of claim 24, wherein a first numerology of the additional RS corresponds to a second numerology of a RMSI, wherein a bandwidth associated with the SSB including the additional RS is fixed based on a control resource set (CORESET), and wherein the additional RS corresponds to at least one of a tracking reference signal (TRS) or a channel state information reference signal (CSI-RS).

27. The apparatus of claim 24, wherein the one or more processors configured to decode the SSB including the additional RS are further configured to obtain multiple shifts of a timing of the SSB based on a physical downlink control channel (PDCCH)/physical downlink shared channel (PDSCH) detection.

* * * * *